United States Patent
Deshmukh

(10) Patent No.: US 10,813,037 B2
(45) Date of Patent: Oct. 20, 2020

(54) OPERATOR-ID BASED RESTRICTION FOR A CELLULAR NETWORK

(71) Applicant: T-Mobile USA, Inc., Bellevue, WA (US)

(72) Inventor: Amit Shantanu Deshmukh, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/280,932

(22) Filed: Feb. 20, 2019

(65) Prior Publication Data

US 2020/0267625 A1 Aug. 20, 2020

(51) Int. Cl.
*H04W 8/04* (2009.01)
*H04W 48/02* (2009.01)
*H04W 8/18* (2009.01)

(52) U.S. Cl.
CPC .......... *H04W 48/02* (2013.01); *H04W 8/04* (2013.01); *H04W 8/186* (2013.01)

(58) Field of Classification Search
CPC ........ H04W 48/02; H04W 8/186; H04W 8/04
See application file for complete search history.

(56) References Cited

U.S. PATENT DOCUMENTS

| 9,432,928 B1 | 8/2016 | Keller et al. | |
|---|---|---|---|
| 2008/0311907 A1 | 12/2008 | Watson et al. | |
| 2011/0195700 A1 | 8/2011 | Kukuchka et al. | |
| 2011/0230188 A1 | 9/2011 | Gemski | |
| 2011/0270747 A1* | 11/2011 | Xu | H04W 8/18 705/40 |
| 2014/0235236 A1 | 8/2014 | Gallmann et al. | |
| 2016/0142192 A1* | 5/2016 | Damnjanovic | H04L 27/261 370/329 |
| 2017/0230818 A1* | 8/2017 | Park | H04W 8/02 |

OTHER PUBLICATIONS

European Patent Application No. 20157028.0, European Search Report dated Jun. 15, 2020, 8 pages.

* cited by examiner

*Primary Examiner* — Chuong A Ngo
(74) *Attorney, Agent, or Firm* — Han Santos, PLLC

(57) ABSTRACT

An access management element of a cellular network uses a network operator identifier to determine whether a user device is allowed to use a particular set of resources of the cellular network. When the access management element of the cellular network receives an attach request from a user device, the access management element queries an entitlement server to obtain a network operator identifier based on an identity of the user device. The access management element then determines whether to allow access by the user device to the particular set of network resources in the cellular network based on the network operator identifier.

20 Claims, 11 Drawing Sheets

Message Format
< Update-Location-Request> ::= < Diameter Header: 316, REQ, PXY, 16777251 > < Session-Id > [ Vendor-Specific-Application-Id ]
{ Auth-Session-State }
{ Origin-Host }
{ Origin-Realm } (include MNC and/or MCC)
[ Destination-Host ]
{ Destination-Realm }
{ User-Name }
*[ Supported-Features ]
[ Terminal-Information ]
{ RAT-Type }
{ ULR-Flags }
[ UE-SRVCC-Capability ]
{ Visited-PLMN-Id }
[ SGSN-Number ]
[ Homogeneous-Support-of-IMS-Voice-Over-PS-Sessions ]
[ GMLC-Address ]
*[ Active-APN ]
[ Equivalent-PLMN-List ]
[ MME-Number-for-MT-SMS ]
[ SMS-Only ]
[ SMS-Register-Request ]
*[ AVP ]
*[ Proxy-Info ]
*[ Route-Record ]
* [ Operator-ID ]

FIG. 4

OPERATOR-ID BASED RESTRICTION FOR A CELLULAR NETWORK

BACKGROUND

In a hybrid 5G architecture (Option 3X), a 5G capable user equipment (UE) sends an attach request with a "DC-NR" bit towards the Mobility Management Entity (MME). The MME upon receiving the attach request performs authentication with a Home Subscriber Server (HSS) followed by an Update Location Request (ULR) towards the HSS over the diameter interface. In response, the HSS in the Update Location Answer (ULA) may indicate that 5G capable New Radio (NR) is not allowed. This acceptance or rejection is based on the carrier's Mobile Country Code (MCC) and the Mobile Network Code (MNC).

A Mobile Virtual Network Operator (MVNO) is a wireless communications service provider that does not own the physical wireless network infrastructure over which it provides services to its customers. An MVNO enters into a business agreement with the host carrier that owns the physical wireless network infrastructure. The business agreement gives MVNO bulk access to wireless communication services of the host carrier at wholesale rates. The MVNO in turn parcels the wireless communication services for distribution to individual consumers at retail rates. An MVNO may use its own customer service, billing support systems, marketing, and sales personnel.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 4 illustrates an example ULR that carries MNC, MCC, and operator-ID from an MME to an HSS.

DETAILED DESCRIPTION

This disclosure is directed to systems and techniques that restricts access to premium network resources of a host carrier by user devices of Mobile Virtual Network Operators (MVNOs). An MVNO using a cellular network of the host carrier to may share the same Mobile Country Code (MCC) and/or Mobile Network Code (MNC) as the host carrier. This potentially allows 5G capable user devices of subscribers serviced by the MVNO to tap into the 5G infrastructure and resources of the host carrier. Accordingly, in some embodiments, the host carrier of a cellular network may use a network operator identifier, also referred to as operator-ID, to determine whether a user device is allowed to use a particular set of network sources of the cellular network. The particular set of network resources may be a set of premium network resources of the cellular network, such as higher bandwidth 5G network resources. The use of the higher bandwidth 5G network resources by the user device, as opposed to lower bandwidth network resources (e.g., LTE network resources), may enable the user device to send and receive communication data via the cellular network of the host carrier at up to the 5G data rate.

In some embodiments, when an access management element of the cellular network receives an attach request from a user device, the access management element queries an entitlement server (ES) to obtain an operator-ID based on an identity of the user device. The access management element then determines whether to allow access by the user device to a particular set of network resources in the cellular network based on the operator-ID. A user device of an MVNO may therefore be denied access to the particular set of network resources based on the operator-ID, even when the user device's MCC and MNC are identical to that of the host carrier.

Figure 1:
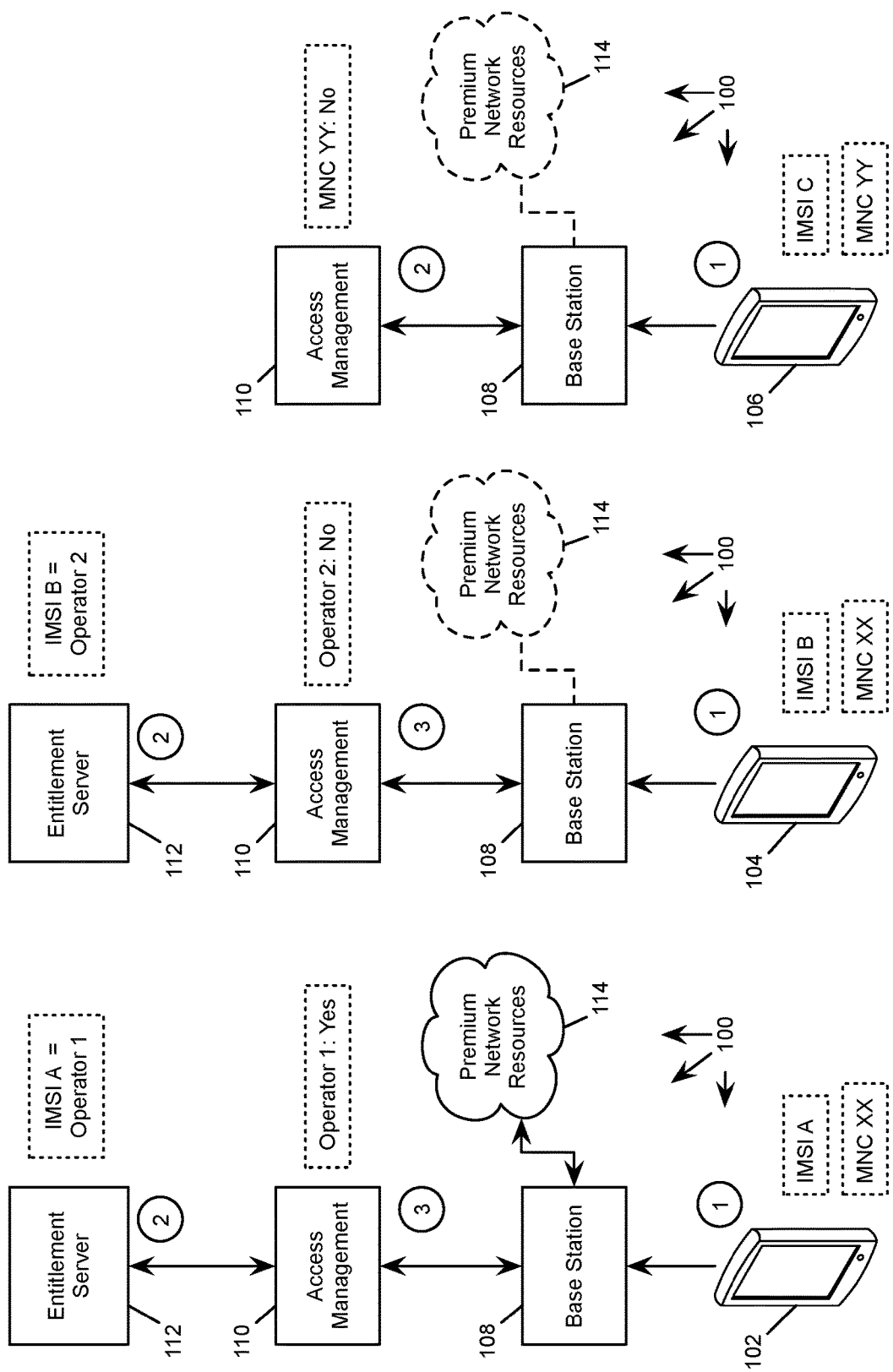
FIG. 1a-c conceptually illustrate a cellular network handling access requests by user devices belonging to different network operators.

FIG. 1a-c conceptually illustrate a cellular network 100 handling access request by user devices belonging to different network operators. Specifically, the cellular network uses the operator-IDs of the network operators that provide cellular service to the user devices to determine whether the user devices are allowed to use a set of premium network resources. FIG. 1a illustrates an access request by a user device 102 whose network operator is the host carrier of the cellular network 100. FIG. 1b illustrates an access request by a user device 104 whose network operator is an MVNO that is entitled to use the cellular network but not the set of premium network resources. FIG. 1c illustrates an access request by a user device 106 whose network operator is not entitled to use the cellular network 100. Each of the user devices 102, 104, and 106 may be a desktop computer, a laptop computer, a tablet computer, a smartphone, a smartwatch, a personal digital assistant (PDA), or any other computing device or mobile device that is capable of communicating with other devices via the cellular network 100.

The cellular network 100 is a mobile communications network having physical wireless network infrastructure that includes various network, computing, and communications resources. As illustrated, the cellular network 100 includes base stations, such as a base station 108, an access management element 110, an entitlement server 112, and a set of premium network resources 114. These premium network resources 114 are owned or controlled by a host carrier or host network operator.

The base station 108 is a telecommunications node in the cellular network 100. Specifically, the base station connects mobile phones or other types of user devices with the wider mobile communications network of the cellular network 100. The base station 108 may be a node B that adheres to the Universal Mobile Telecommunications system (UMTS) standard. The base station 108 may be an Evolved Node B (eNodeB) capable of connecting user devices to a fourth generation (4G) Long-Term Evolution (LTE) network. The base station may also be a gNodeB capable of connecting user devices to a fifth generation (5G) New Radio (NR) network. The base station may relay data regarding a user device to components of the cellular network 100 such as the access management element 110 and the entitlement server 112 through the base station 108. The base station 108 may also block or allow traffic flow between a user device with the set of premium network resources 114.

The access management element 110 is a component of the cellular network 100 that controls access to the set of premium network resources 114. The access manager uses the operator-ID, MNC, and MCC associated with the user device to determine whether access of the set of premium network resources 114 should be allowed. The access management element 110 may communicate with the entitlement server 112 to obtain the operator-ID of the network operator of a user device. The access management element 110 may also communicate with a subscriber server (not illustrated) to authenticate a user device and to determine whether the user device is allowed access to the set of premium network resources 114 based on the obtained operator-ID. The subscriber server may be a home subscriber server (HSS) that maintains a master user database that supports network entities that handle phone calls.

In some embodiments, the functions of the access management element 110 is performed by a mobility management element (not illustrated). A mobility management element (MME) is a component of the cellular network 100 that handles paging, authentication, and registration of LTE-compatible user devices with the EPC. The MME may track the positions of user devices as the user devices move from base station to base station. In some embodiments, the functions of the access management element 110 is part of an Access and Mobility Management Function (AMF) that manages mobility for a 5G core network and is capable of determining whether access to the 5G core network is allowed based on operator-ID.

The entitlement server 112 provides the operator-ID of the user device to the access management element 110. In some embodiments, the entitlement server 112 provides a lookup function that maps the identity of the user device (e.g., International Mobile Subscriber Identity or IMSI) to the operator-ID of the carrier. The entitlement server 112 may be an entitlement server of the host carrier or a third-party identity and access management (IAM) server. The entitlement server may also be a secure entitlement server (SES). The entitlement server 112 provides information that can be used to verify whether a user device or a subscriber is entitled to a specific set of resources at a specific interval of time for a specific reason.

The set of premium network resources 114 may include network, computing, and communications resources of the cellular network 100 that provide additional values to the subscribers of the host carrier, such as higher communications bandwidth or better computing resources. However, MVNOs using cellular network 100 may or may not be entitled to provide the use of the set of premium network resources 114 to the subscribers of the MVNOs. Alternatively, MVNOs may be entitled to provide the use of a limited subset of the premium network resources at specific time intervals for specific reasons to the subscribers of the MVNOs. The access management element 110 uses the operator-ID provided by the entitlement server 112 to identify the network operator (whether an MVNO or the host carrier) of a user device and to decide whether to grant access to the set of premium network resources 114 (by e.g., querying a subscriber server or by performing access management function at an AMF.)

FIG. 1a illustrates an access request by the user device 102. The user device 102 is a subscribing device of the host carrier of the cellular network 100 and is entitled to use the premium network resources 114. At an operation labeled '1', the IMSI of the user device 102 (illustrated as "IMSI A") and the MNC and MCC of the user device 102 (illustrated as "MNC XX") are submitted to the cellular network 100 through the base station 108. At an operation labeled '2', the access management element 110 uses the IMSI of the user device 102 to obtain an operator-ID (illustrated as "Operator 1") that identifies the network operator of the user device 102. At an operation labeled '3', the access management element 110 uses the obtained operator-ID to determine that the user device 102 is entitled to access the premium network resources 114.

FIG. 1b illustrates an access request by the user device 104. The user device 104 is a subscribing device of an MVNO that has an agreement with the host carrier to use the cellular network 100. The user device 104 is entitled to use some part of the cellular network 100 but not the premium network resources 114. At an operation labeled '1', the IMSI of the user device 104 (illustrated as "IMSI B") and the MNC and MCC of the user device 104 (illustrated as "MNC XX") are submitted to the cellular network 100 through the base station 108. At an operation labeled '2', the access management element 110 uses the IMSI of the user device 104 to obtain an operator-ID (illustrated as "Operator 2") that identifies the network operator of the user device 104. At an operation labeled '3', the access management element 110 uses the obtained operator-ID to determine that the user device 104 is not entitled to access the premium network resources 114. It is worth noting that, though the MNC and MCC of the user device 104 are identical to the MNC and MCC of the user device 102 ("MNC XX"), the user device 104 is not permitted to use the premium network resources 114 based on its operator-ID.

FIG. 1c illustrates an access request by a user device 106. The user device 106 is a subscribing device of a network operator that is not entitled to use the cellular network 100 at all. At an operation labeled '1', the IMSI of the user device 106 (illustrated as "IMSI C") and the MNC and MCC of the user device 106 (illustrated as "MNC YY") are delivered to the cellular network 100 through the base station 108. At an operation labeled '2', the access management element 110 uses the MNC and MCC of the user device 106 to determine that the user device 106 is not entitled to use the cellular network 100 at all. In this example, the MNC and MCC of the user device 106 ("MNC YY") are different than the MNC and MCC of the host carrier or the MVNOs of the cellular network 100 ("MNC XX").

Figure 2:
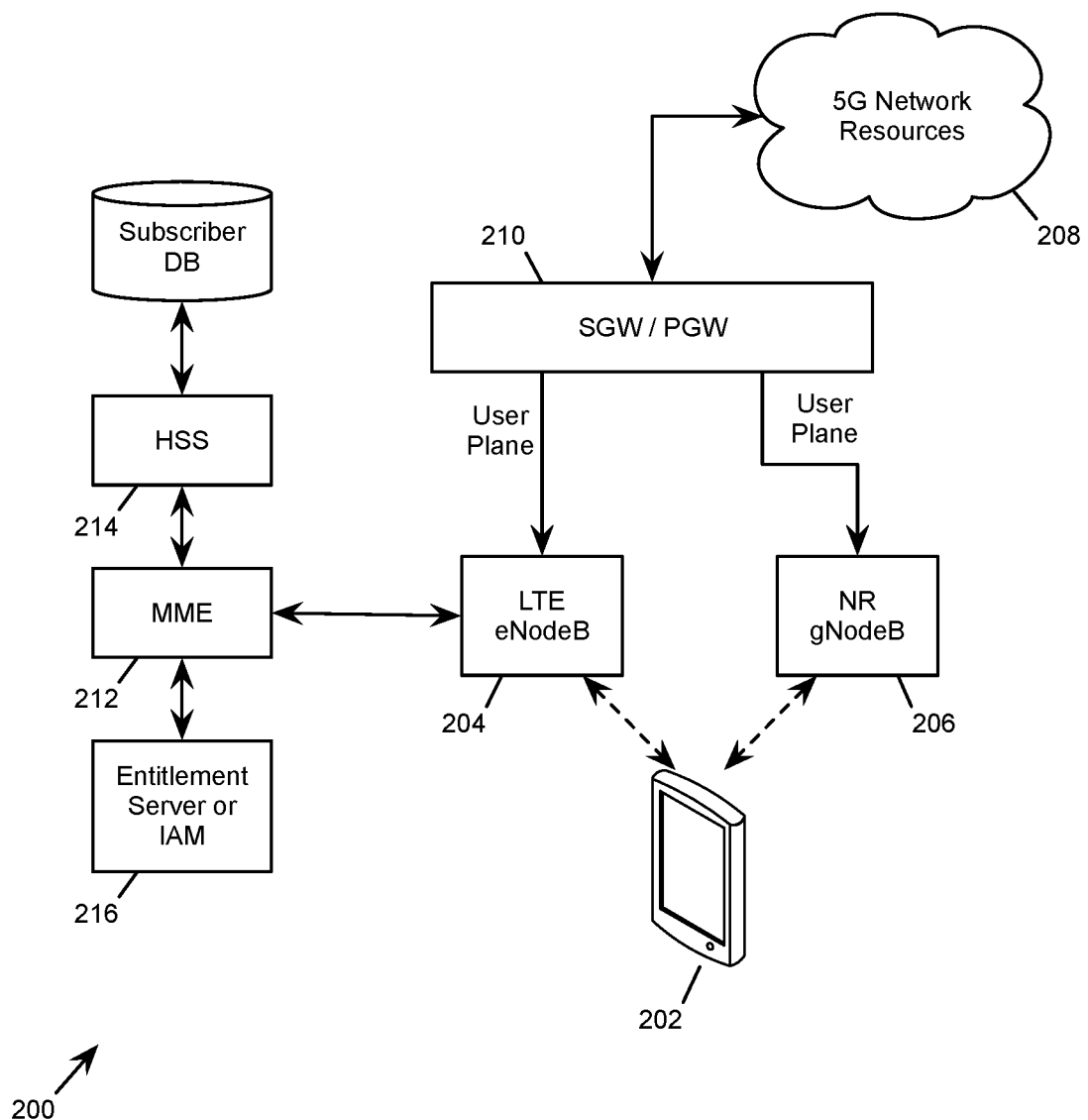
FIG. 2 conceptually illustrates a first example cellular network that uses operator-ID to determine whether a user device is allowed to access a particular set of network resources.

FIG. 2 conceptually illustrates a first example cellular network that uses operator-ID to determine whether a user device is allowed to access a particular set of network resources. In the example, a cellular network 200 determines whether a 5G capable user device 202 is allowed access to a set of 5G capable resources in the cellular network. The user device 202 may be used by a subscriber of the host carrier to access resources of the cellular network 200, or alternatively, used by a subscriber of an MVNO and is contractually allowed limited access to the resources of the cellular network 200.

The cellular network 200 has a hybrid 5G architecture that includes one or more eNodeB base stations 204 and one or more gNodeB base stations 206. The user device 202 is capable of communicating with the LTE radio of the eNodeB base station 204 or with the 5G radio of the gNodeB base station 206. The base stations 204 and 206 may exchange user plane data with 5G network resources 208 through gateways 210. The LTE eNodeB 204 also communicates with an MME 212, which handles mobility management of user devices for the cellular network 200, such as the user device 202.

The MME 212 is in communication with a subscriber server (HSS) 214 and an entitlement server (IAM or ES) 216. The HSS 214 uses a subscriber database to authenticate the user device 202 to the cellular network. The entitlement server 216 provides operator-ID to the MME 212 so the MME 212 and the HSS 214 may determine whether to allow the user device 202 access to the 5G network resources 208.

Figure 3:
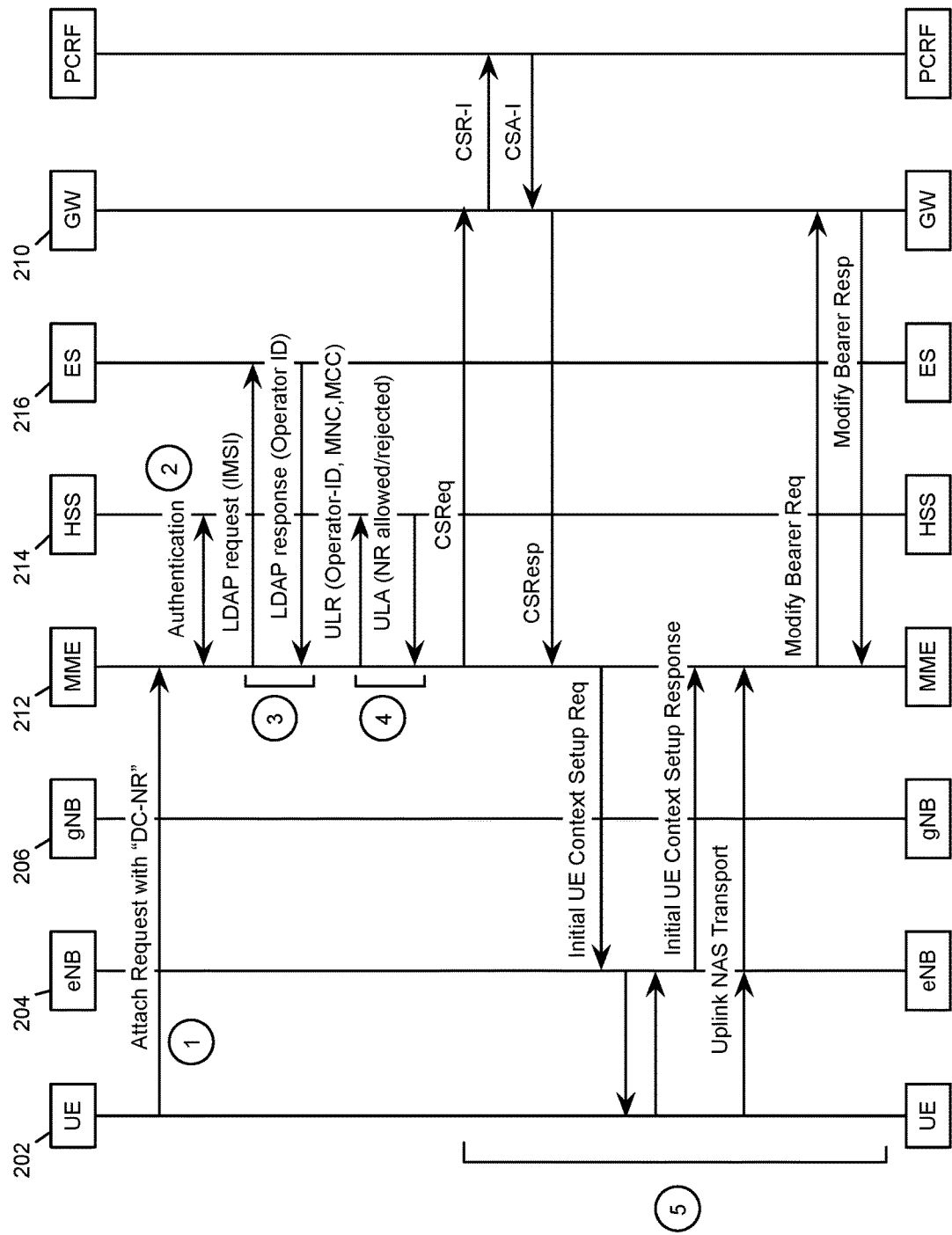
FIG. 3 conceptually illustrates a sequence of data exchanges in a hybrid 5G architecture when an operator-ID is used to determine whether to allow a user device access to 5G network resources.

FIG. 3 conceptually illustrates a sequence of data exchanges in a hybrid 5G architecture when an operator-ID is used to determine whether to allow a user device access to 5G network resources. Specifically, the figure illustrates data exchanges between components of the cellular network 200 when the cellular network determines whether to grant the user device 202 access to the 5G network resources 208. The data exchanges in the sequence are labeled '1' through '5'.

As illustrated, during data exchanges labeled '1', the user device 202 sends an attach request with "DC-NR" bit set to the MME 212 (through the base station 204 or 206) to indicate that the user device 202 is a 5G-capable device. During data exchanges labeled '2', the MME 212 communicates with the HSS 214 to authenticate the user device 202.

During data exchanges labeled '3', the MME 212 uses the IMSI of the user device 202 to query the entitlement server 216 to obtain an operator-ID of the MVNO that is associated with the user device 202. In some embodiments, the query and the response use Lightweight Directory Access Protocol (LDAP).

During data exchanges labeled '4', the MME 212 sends the obtained operator-ID to the HSS 214, along with the MCC and MNC associated with the user device 202. The HSS 214 then informs the MME 212 whether access to 5G network resources (the attach request with "DC-NR-bit" set) is allowed or not ("NR allowed or rejected), based on the operator-ID, the MCC associated with the user device 202, and the MNC associated with the user device 202. Alternatively, the HSS 214 may make the determination of whether to allow or deny the user device 202 access to the 5G network resources solely based on the operator-ID, and then inform the MME 212. In some embodiments, the operator-ID, the MCC and the MNC are sent to the HSS 214 in an Update Location Request (ULR), while the response from the HSS 214 is in an Update Location Answer (ULA). The ULR may embed the operator-ID as an attribute value pair (AVP). FIG. 4 illustrates an example ULR that carries MNC, MCC and operator-ID from the MME 212 to the HSS 214.

The HSS 214 may use a resource access control list (e.g., a black list of disallowed operator-IDs and/or MCC/MNC, or a white list of allowed operator-IDs and/or MCC/MNC) to determine whether to allow access based on the operator-ID, the MCC and the MNC. For example, a user device may be allowed access if the resource access control list indicates that the operator-ID, the MCC, and the MNC associated with the user device all have allowable values. In an alternative example, a user device may be denied access if the resource access control list indicates any one of the operator-ID, the MCC, or the MNC associated with the user device has a disallowed value. In some embodiments, the HSS may deny the user device access when the operator-ID associated with the user device is null or zero.

During data exchanges labeled '5', based on the response from the HSS 214, the MME 212 communicates with the gateways 210 and the base station 204 or 206 to either allow the user device 202 to access the 5G network resources or to block the user device 202 from accessing the 5G network resources.

Figure 5:
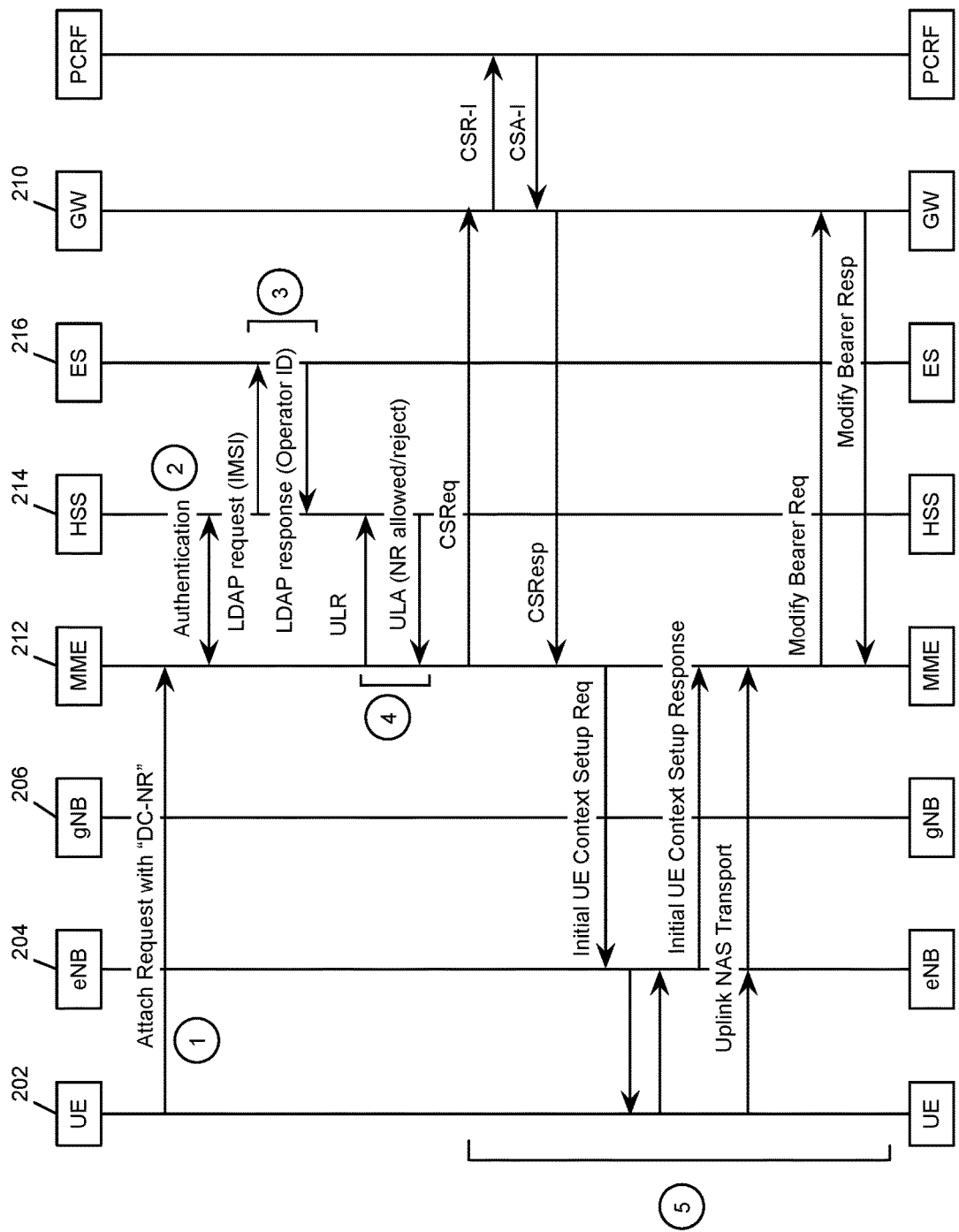
FIG. 5 conceptually illustrates an alternative sequence of data exchanges in a hybrid 5G architecture in which the HSS obtains the operator-ID.

In some embodiments, the HSS 214, rather than the MME 212, obtains the operator-ID from the entitlement server for determining whether to allow a user device access to 5G network resources. FIG. 5 conceptually illustrates an alternative sequence of data exchanges in a hybrid 5G architecture in which the HSS obtains the operator-ID. The data exchanges in the sequence are labeled '1' through '5'. As illustrated, during data exchanges labeled '1', the user device 202 sends an attach request with "DC-NR bit" set to the MME 212 (through the base station 204 or 206) to indicate that the user device 202 is a 5G-capable device. During data exchanges labeled '2', the MME 212 communicates with the HSS 214 to authenticate the user device 202.

During data exchanges labeled '3', the HSS 214 uses the IMSI of the user device 202 to query the entitlement server 216 to obtain the corresponding operator-ID. In some embodiments, the query and the response between the HSS and the entitlement server are in LDAP.

At data exchanges labeled '4', the MME 212 sends the MCC and MNC associated with the user device 202 to the HSS 214. The HSS 214 in response informs the MME 212 whether access to 5G network resources (the attach request with "DC-NR" bit set) is allowed or not ("NR allowed or rejected), based on the operator-ID, the MCC associated with the user device 202, and the MNC associated with the user device 202. Alternatively, the HSS 214 may make the determination of whether to allow or deny the user device 202 access to the 5G network resources solely based on the operator-ID, and then inform the MME 212. In some embodiments, the operator-ID, the MCC and the MNC are sent to the HSS 214 in an ULR, while the response from the HSS 214 is in an ULA. The ULR may embed the operator-ID as an AVP.

The HSS 214 may use a resource access control list to determine whether to allow access based on the operator-ID, the MCC and the MNC. For example, a user device may be allowed access if the resource access control list indicates that the operator-ID, the MCC, and the MNC associated with the user device all have allowable values. In an alternative example, a user device may be denied access if the resource access control list indicates any one of the operator-ID, the MCC, or the MNC associated with the user device has a disallowed value. In some embodiments, the HSS may deny the user device access when the operator-ID associated with the use device is null or zero.

At data exchanges labeled '5', based on the response from the HSS 214, the MME 212 communicates with the gateways 210, a policy and charging rules function (PCRF), and the base station 204 or 206 to either allow the user device 202 access to the 5G network resources or to block the user device 202 from accessing the 5G network resources.

Figure 6:
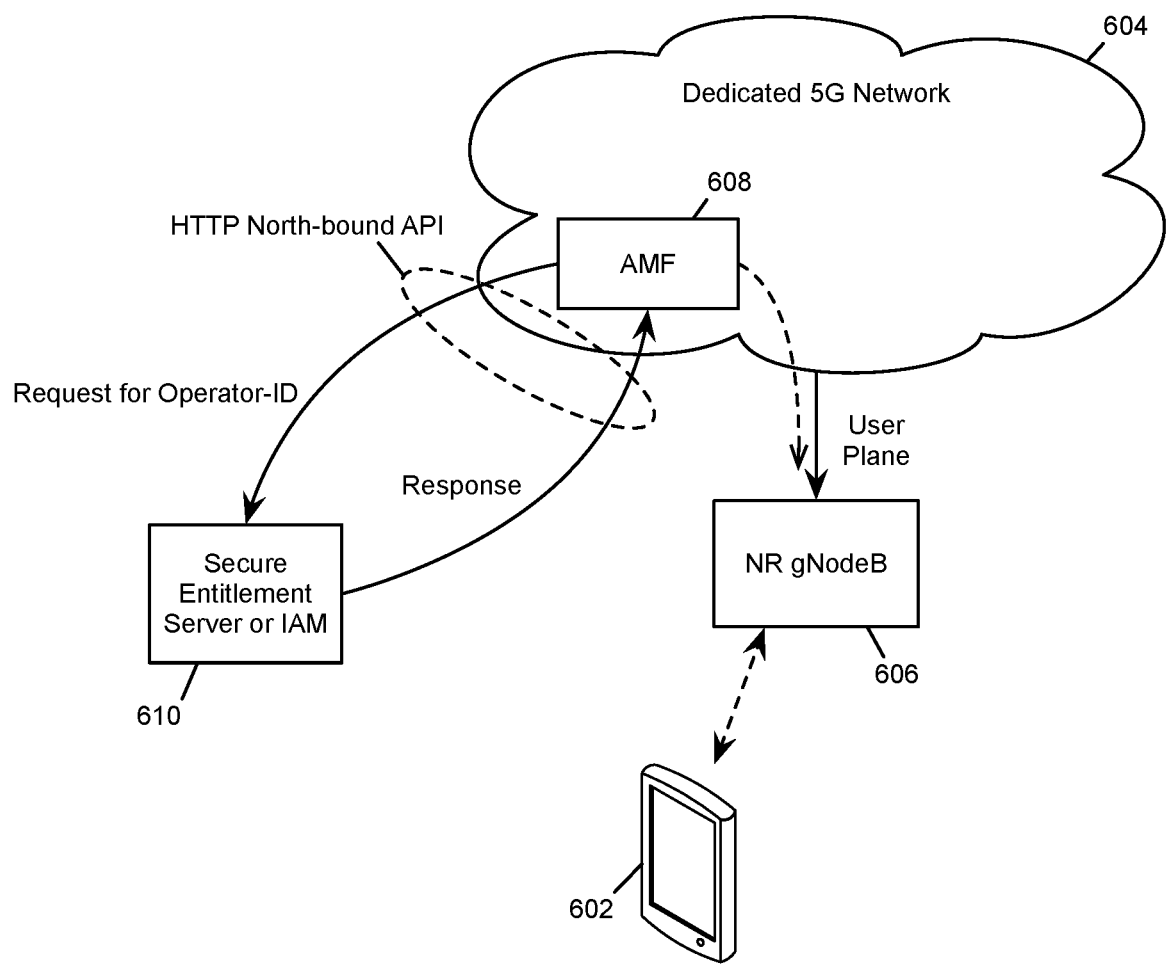
FIG. 6 conceptually illustrates a second example cellular network that uses operator-ID to determine whether a user device is allowed to access a particular set of network resources.

FIG. 6 conceptually illustrates a second example cellular network that uses operator-ID to determine whether a user device is allowed to access a particular set of network resources. In the example, a cellular network 600 determines whether a 5G capable user device 602 is allowed access to a dedicated 5G core network 604 in the cellular network. The user device 602 may be a subscriber of the host carrier of the cellular network 600 or a subscriber of an MVNO that is contractually allowed limited access to the cellular network 600.

The user device 602 may access the dedicated 5G core network 604 through a 5G gNodeB base station 606 and exchange user plane data. The 5G gNodeB 606 also communicates with an AMF 608, which handles access management and mobility management for user the cellular network 600.

The AMF 608 controls the access to the dedicated 5G core network 604. The AMF 608 is in communication with an entitlement server (IAM or ES) 610. The entitlement server 610 provides an operator-ID to the AMF 608 so the AMF 608 may determine whether to grant the user device 602 access to the dedicated 5G core network 604. The AMF 608 may query the entitlement server 610 for the operator-ID by using a set of HTTPS northbound application programing interface (API).

Figure 7:
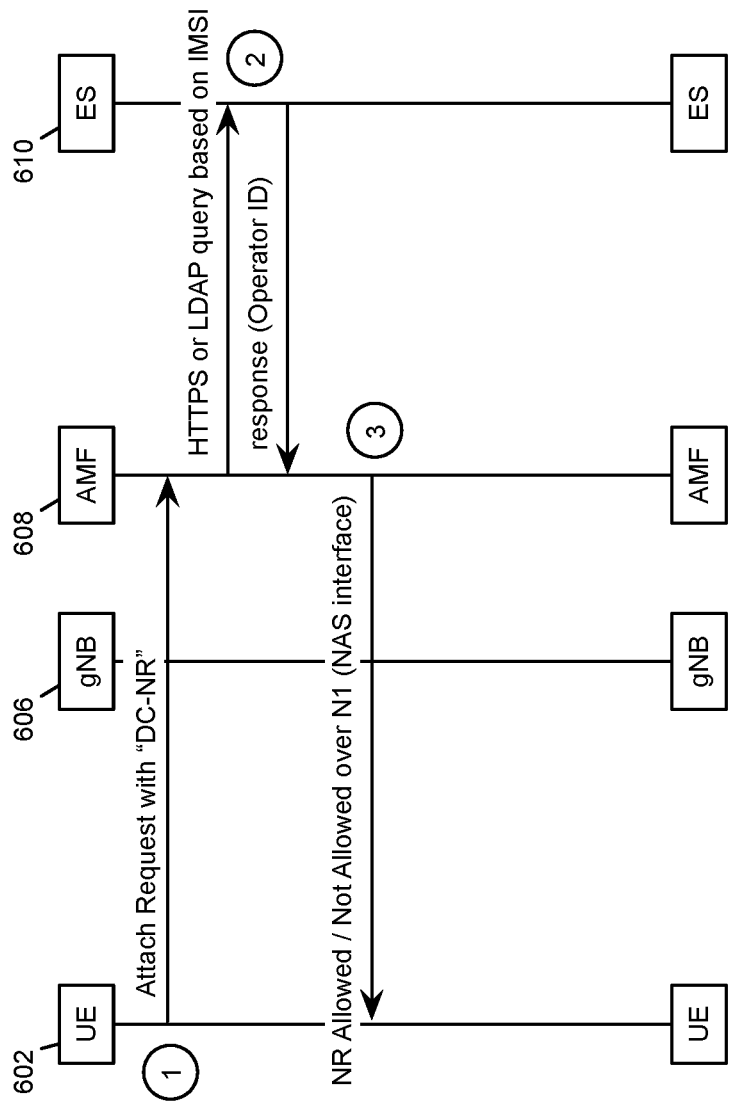
FIG. 7 conceptually illustrates a sequence of data exchanges by a Mobility Management Function (AMF) when an operator-ID is used to determine whether to allow a user device access to a dedicated 5G core network.

FIG. 7 conceptually illustrates a sequence of data exchanges by an AMF when an operator-ID is used to determine whether to allow a user device access to a dedicated 5G core network. The data exchanges in the sequence are labeled '1' through '3'.

As illustrated, during data exchanges labeled '1', the user device 602 sends an attach request with "DC-NR" bit set to indicate that the user device 602 is a 5G-capable device. During data exchanges labeled '2', the AMF 608 uses the IMSI of the user device 602 to query the entitlement server 610 to obtain the corresponding operator-ID. In some embodiments, the query and the response use LDAP protocol. In some embodiments, the query and the response are conducted by using a set of HTTPS northbound APIs. The APIs may be representational state transfer (REST) APIs that define a set of constraints to be used for creating web services. The AMF 608 decides whether to allow or disallow access to the dedicated 5G network based on the operator-ID, the MCC associated with the user device 602, and the MNC associated with the user device 602. Alternatively, the AMF 608 may make the determination of whether to allow or deny the user device 602 access to the dedicated 5G network 604 solely based on the operator-ID.

The AMF 608 may use a resource access control list to determine whether to allow access based on the operator-ID, the MCC and the MNC. For example, a user device may be allowed access if the resource access control list indicates that the operator-ID, the MCC, and the MNC associated with the user device all have allowable values. In an alternative example, a user device may be denied access if the resource access control list indicates any one of the operator-ID, the MCC, or the MNC associated with the user device has a disallowed value. In some embodiments, the AMF 608 may deny the use device access when the operator-ID associated with the user device is null or zero.

At data exchanges labeled '3', the AMF 608 transmits a non-access stratum (NAS) message over an N1 interface to the user device 602. The message indicates whether the requested access to the 5G network resources is allowed or disallowed (NR allowed or not allowed).

Figure 8:
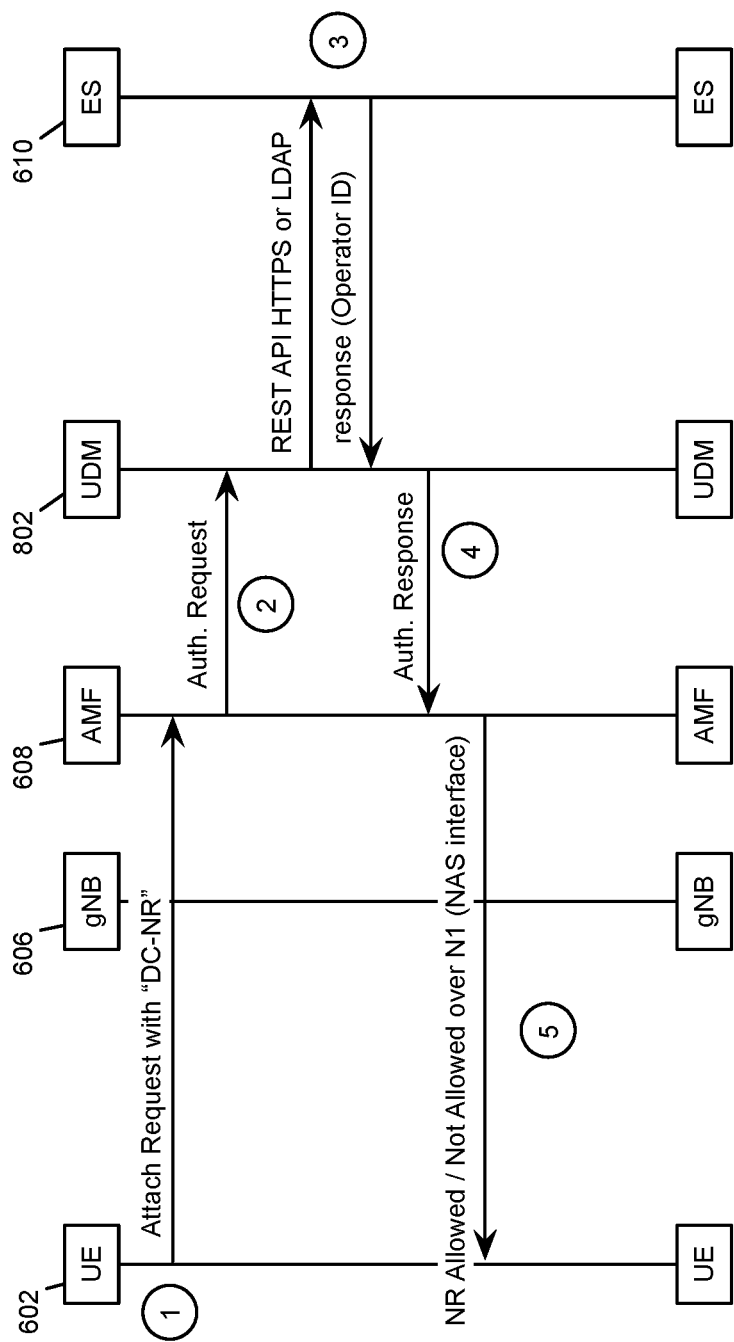
FIG. 8 conceptually illustrates an alternative sequence of data exchanges by an AMF when an operator-ID is used to determine whether to allow a user device access to a dedicated 5G core network.

FIG. 8 conceptually illustrates an alternative sequence of data exchanges by an AMF when an operator-ID is used to determine whether to allow a user device access to a dedicated 5G core network. Specifically, a unified data management (UDM) element 802 in the cellular network 600 is used to query the entitlement server for the operator-ID. The data exchanges in the sequence are labeled '1' through '5'.

As illustrated, during data exchanges labeled '1', the user device 602 sends an attach request with "DC-NR" bit set to the AMF 608 (through the base station 606) to request access to 5G network resources. During data exchanges labeled '2', the AMF 608 sends an authentication request to the UDM 802.

During data exchange labeled '3', the UDM 802 uses the IMSI of the user device 602 to query the entitlement server 610 to obtain the corresponding operator-ID. In some embodiments, the query and the response use LDAP. In some embodiments, the query and the response are conducted by using a set of HTTPS northbound APIs. The APIs may be REST APIs that define a set of constraints to be used for creating web services.

During data exchange labeled '4', the UDM 802 respond to the query by the AMF 608 with the operator-ID obtained from the entitlement server. The AMF 608 decides whether to allow or disallow access to the dedicated 5G network based on the operator-ID, the MCC associated with the user device 602, and the MNC associated with the user device 602. Alternatively, the AMF 608 may make the determination of whether to allow or deny the user device 602 access to the dedicated 5G network 604 solely based on the operator-ID.

The AMF 608 may use a resource access control list to determine whether to allow access based on the operator-ID, the MCC and the MNC. For example, a user device may be allowed access if the resource access control list indicates that the operator-ID, the MCC, and the MNC associated with the user device all have allowable values. In an alternative example, a user device may be denied access if the resource access control list indicates any one of the operator-ID, the MCC, or the MNC associated with the user device has a disallowed value. In some embodiments, the AMF 608 may deny the use device access when the operator-ID associated with the user device is null or zero.

At data exchanges labeled '5', the AMF 608 transmits a Non-Access Stratum (NAS) message over an N1 interface to the user device 602. The message indicates whether the requested access to the 5G network resources is allowed or disallowed (NR allowed or not allowed).

Figure 9:
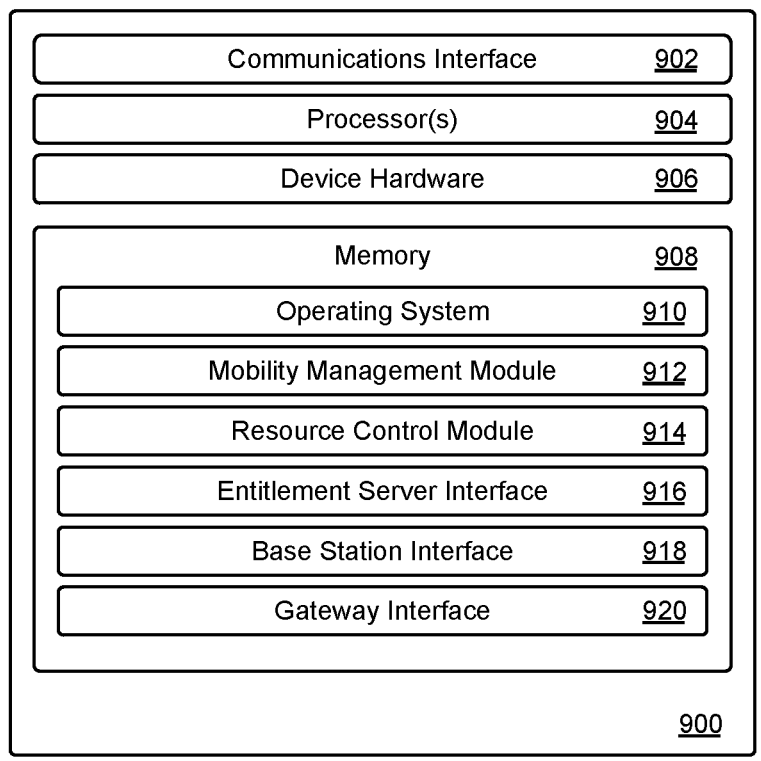
FIG. 9 is a block diagram showing various components of an example AMF, consistent with an exemplary embodiment.

FIG. 9 is a block diagram showing various components of an example AMF, consistent with an exemplary embodiment. The figure illustrates a computing device 900 implementing the AMF 608. The computing device 900 may be a general-purpose computer, such as a desktop computer, tablet computer, laptop computer, server, or an electronic device that is capable of receiving inputs, processing the inputs, and generating output data. The computing device 900 may also be a virtual computing device such as a virtual machine or a software container that is hosted in a cloud.

The computing device 900 may be equipped with one or more of the following: a communications interface 902, one or more processors 904, device hardware 906, and memory 908. The communications interface 902 may include wireless and/or wired communication components that enable the computing devices to transmit data to and receive data from other devices. The data may be relayed through a dedicated wired connection or via a communications network. The device hardware 906 may include additional hardware that performs user interface, data display, data communication, data storage, and/or other server functions.

The memory 908 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 904 and the memory 908 of the computing device 900 may implement an operating system 910, a mobility management module 912, a resource control module 914, an entitlement sever interface 916, a base station interface 918, and a gateway interface 920.

The operating system 910 may include components that enable the computing device 900 to receive and transmit data via various interfaces (e.g., user controls, communications interface, and/or memory input/output devices), as well as to process data using the processors 904 to generate output. The operating system 910 may include a presentation component that presents the output (e.g., display the data on an electronic display, store the data in memory, transmit the data to another electronic device, etc.). The operating system 910 may include a hypervisor that allows the computing device to operate one or more virtual machines and/or virtual network components. Additionally, the operating system 910 may include other components that perform various additional functions generally associated with an operating system.

The mobility management module 912 is a software component that enables the computing device 900 to handles paging, authentication, and registration of user devices that are connected to a cellular network. The mobility management module 912 may track the positions of user devices as the user devices move from base station to base station.

The resource control module 914 is a software component that enables the computing device to verify whether a user device is allowed to access a particular set of resources in the cellular network. For example, the resource control module 914 may compare the operator-ID, MNC, and MCC associated with a user device with content of a resource access control list (e.g., a black list of disallowed operator-IDs and/or MCC/MNC, or a white list of allowed operator-IDs and/or MCC/MNC) to determine whether the user device is allowed to use the particular set of resources.

The entitlement server interface 916 is a software component that handles the interaction with an entitlement server (e.g., SES or JAM), specifically for querying the entitlement server to obtain the operator-ID based on the IMSI of the user device. In some embodiments, the entitlement server interface 916 uses LDAP for querying the entitlement server. In some embodiments, the entitlement server interface 916 includes a set of RESTful APIs in order to communicate with the entitlement server.

The base station interface 918 is a software component that handles interactions with base stations (eNodeB or gNodeB). Through the base station interface 918, the computing device 900 receives identifying information from a user device, including the user device's IMSI, MCC, and MNC. The base station interface 918 may handle NAS messages over an N1 interface with the user device.

The gateway interface 920 is a software component that handles interactions with gateway components of the cellular network, gateways such as a serving gateway (SGW) and a packet data network gateway (PGW) that control access to a core network of the cellular network or to a set of premium network resources of the cellular network.

Figure 10:
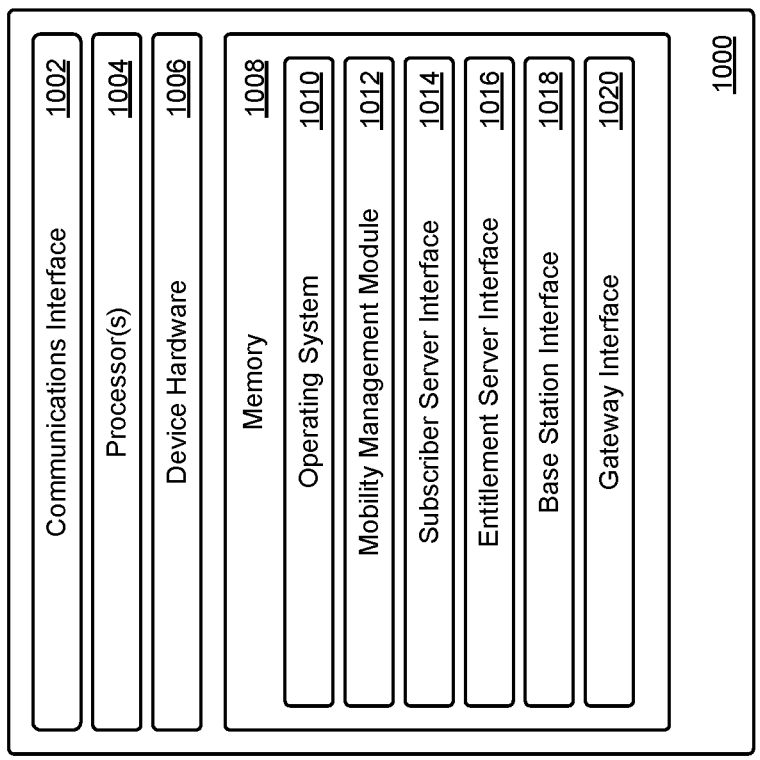
FIG. 10 is a block diagram showing various components of an example MME, consistent with an exemplary embodiment.

FIG. 10 is a block diagram showing various components of an example mobility management element or MME, consistent with an exemplary embodiment. The figure illustrates a computing device 1000 implementing the MME 212. The computing device 1000 may be a general-purpose computer, such as a desktop computer, tablet computer, laptop computer, server, or an electronic device that is capable of receiving inputs, processing the inputs, and generating output data. The computing device 1000 may also be a virtual computing device such as a virtual machine or a software container that is hosted in a cloud.

The computing device 1000 may be equipped with one or more of the following: a communications interface 1002, one or more processors 1004, device hardware 1006, and memory 1008. The communications interface 1002 may include wireless and/or wired communication components that enable the computing devices to transmit data to and receive data from other devices. The data may be relayed through a dedicated wired connection or via a communications network. The device hardware 1006 may include additional hardware that performs user interface, data display, data communication, data storage, and/or other server functions.

The memory 1008 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 1004 and the memory 1008 of the computing device 1000 may implement an operating system 1010, a mobility management module 1012, a subscriber server interface 1014, an entitlement server interface 1016, a base station interface 1018, and a gateway interface 1020.

The operating system 1010 may include components that enable the computing device 1000 to receive and transmit data via various interfaces (e.g., user controls, communications interface, and/or memory input/output devices), as well as process data using the processors 1004 to generate output. The operating system 1010 may include a presentation component that presents the output (e.g., display the data on an electronic display, store the data in memory, transmit the data to another electronic device, etc.). The operating system 1010 may include a hypervisor that allows the computing device to operate one or more virtual machines and/or virtual network components. Additionally, the operating system 1010 may include other components that perform various additional functions generally associated with an operating system.

The mobility management module 1012 is a software component that enables the computing device 1000 to handles paging, authentication, and registration of user devices that are connected to a cellular network. The mobility management module may track the positions of user devices as the user devices move from base station to base station.

The subscriber server interface 1014 is a software component that handles the query and response with the subscriber server. In some embodiments, the subscriber server interface 1014 sends the operator-ID, the MNC, and the MCC associated with a user device to the subscriber server (e.g., HSS 214) in a ULR and obtains a decision regarding whether the user device is allowed to use a particular set of resources in a ULA.

The entitlement server interface 1016 is a software component that handles the interaction with an entitlement server (e.g., SES or IAM), specifically for querying the entitlement server to obtain the operator-ID based on the IMSI of the user device. In some embodiments, the entitlement server interface 1016 uses LDAP for querying the entitlement server. In some embodiments, the entitlement server interface 1016 includes a set of RESTful APIs in order to communicate with the entitlement server.

The base station interface 1018 is a software component that handles interactions with base stations (eNodeB or gNodeB). Through the base station interface 1018, the computing device 1000 receives identifying information from a user device, including the user device's IMSI, MCC, and MNC. The base station interface 1018 may handle NAS messages over an N1 interface with the user device.

The gateway interface 1020 is a software component that handles interactions with gateway components of the cellular network, gateways such as a serving gateway (SGW) and a packet data network gateway (PGW) that control access to a core network of the cellular network or to a set of premium network resources of the cellular network.

Figure 11:
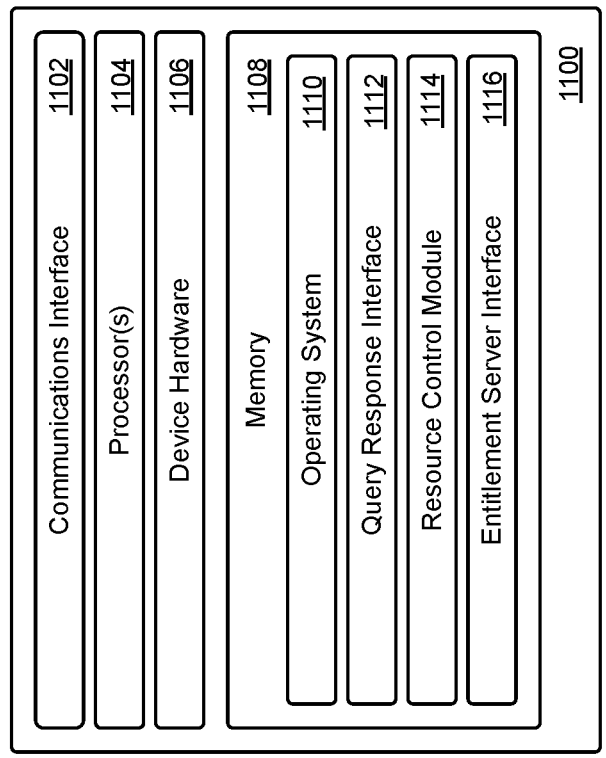
FIG. 11 is a block diagram showing various components of an example subscriber server, consistent with an exemplary embodiment.

FIG. 11 is a block diagram showing various components of an example subscriber server, consistent with an exemplary embodiment. The figure illustrates a computing device 1100 implementing the HSS 214. The computing device 1100 may be a general-purpose computer, such as a desktop computer, tablet computer, laptop computer, server, or an electronic device that is capable of receiving inputs, processing the inputs, and generating output data. The computing device 1100 may also be a virtual computing device such as a virtual machine or a software container that is hosted in a cloud.

The computing device 1100 may be equipped with one or more of the following: a communications interface 1102, one or more processors 1104, device hardware 1106, and memory 1108. The communications interface 1102 may include wireless and/or wired communication components that enable the computing devices to transmit data to and receive data from other devices. The data may be relayed through a dedicated wired connection or via a communications network. The device hardware 1106 may include additional hardware that performs user interface, data display, data communication, data storage, and/or other server functions.

The memory 1108 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 1104 and the memory 1108 of the computing device 1100 may implement an operating system 1110, a query response interface 1112, a resource control module 1114, and an entitlement sever interface 1116.

The operating system 1110 may include components that enable the computing device 1100 to receive and transmit data via various interfaces (e.g., user controls, communications interface, and/or memory input/output devices), as well as process data using the processors 1104 to generate output. The operating system 1110 may include a presentation component that presents the output (e.g., display the data on an electronic display, store the data in memory, transmit the data to another electronic device, etc.). The operating system 1110 may include a hypervisor that allows the computing device to operate one or more virtual machines and/or virtual network components. Additionally, the operating system 1110 may include other components that perform various additional functions generally associated with an operating system.

The query response interface 1112 is a software component that handles query for subscriber information. In some embodiments, the query response interface 1112 receives the operator-ID, the MNC, and the MCC associated with a user device from an MME in a ULR and transmits a response with a decision regarding whether the user device is allowed to use a particular set of resources in a ULA.

The resource control module 1114 is a software component that enables the computing device to verify whether a user device is allowed to access a particular set of resources in the cellular network. For example, the resource control module 1114 may compare the operator-ID, MNC, and MCC associated with a user device with content of a resource access control list (e.g., a black list of disallowed operator-IDs and/or MCC/MNC, or a white list of allowed operator-IDs and/or MCC/MNC) to determine whether the user device is allowed to use the particular set of resources. In some embodiments, the resource control module 1114 receives the operator-ID as part a ULR from an MME. In some embodiments, resource control module 1114 receives the operator-ID from the entitlement server through the entitlement server interface 1116.

The entitlement server interface 1116 is a software component that handles the interaction with an entitlement server (e.g., SES or JAM), specifically for querying the entitlement server to obtain the operator-ID based on the IMSI of the user device. In some embodiments, the entitlement server interface 1116 uses LDAP for querying the entitlement server. In some embodiments, the entitlement server interface 1116 includes a set of RESTful APIs in order to communicate with the entitlement server.

Figure 12:
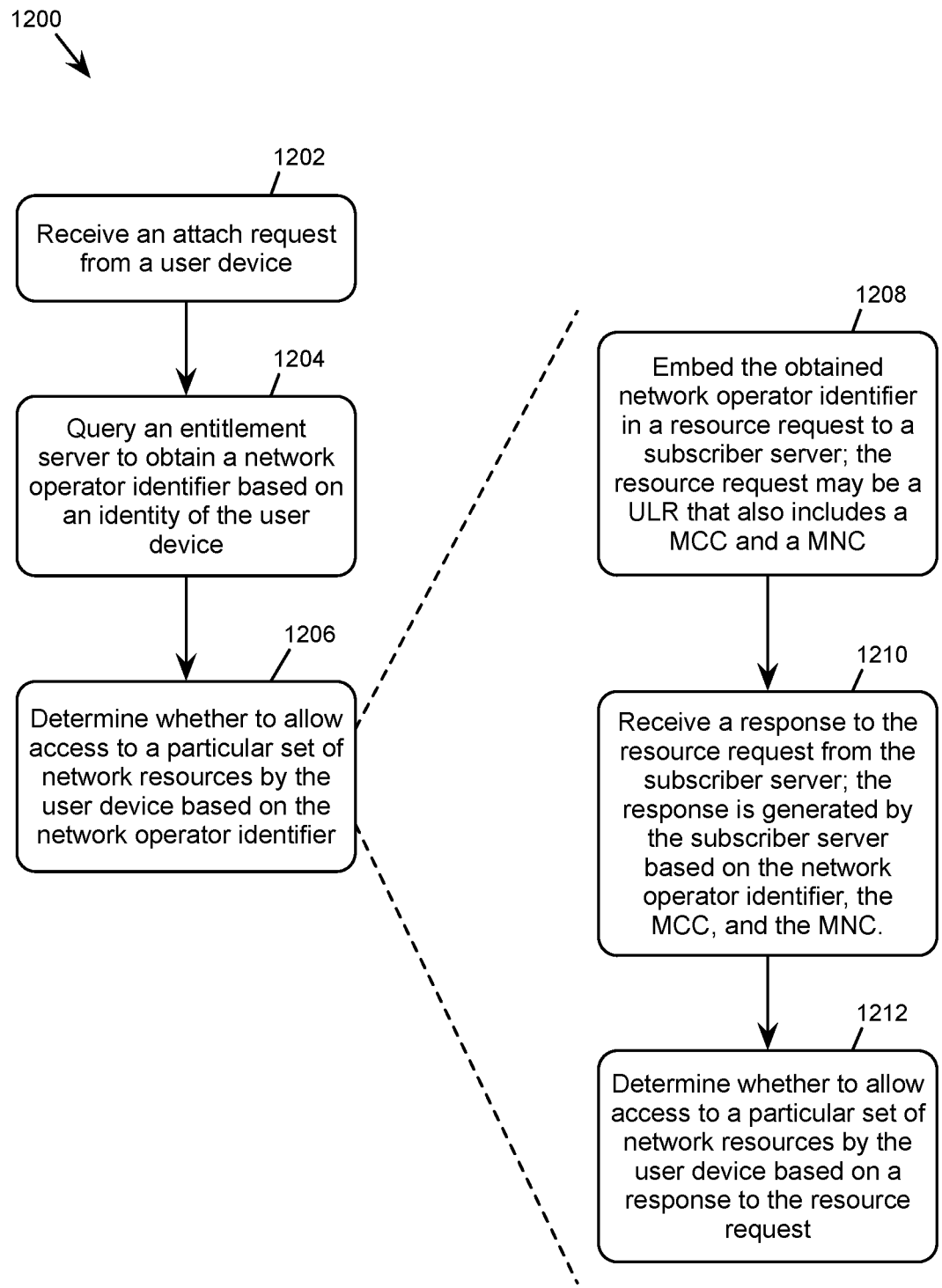
FIG. 12 conceptually illustrates a flow diagram of an example process performed by a cellular network for determining whether to allow access to a set of premium network resources based on operator-ID.

FIG. 12 conceptually illustrates a flow diagram of an example process 1200 performed by a cellular network for determining whether to allow access to a set of premium network resources based on operator-ID. In some embodiments, the process 1200 is performed by a computing device that implements an access management element in the cellular network, such as an MME (such as the computing device 1000) or an AMF (such as the computing device 900).

The process 1200 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 1202, the computing device receives an attach request from a user device. The attach request may include an indication that the user device is capable of using a set of premium network resources in the cellular network. Such an indication may be a "DC-NR" bit that is set to indicate that the user device is a 5G capable device and may use 5G network resources in the cellular network.

At block 1204, the computing device queries an entitlement server to obtain a network operator identifier (i.e., an operator-ID) based on an identity of the user device (e.g., an IMSI). The computing device may query the entitlement server for the network operator identifier by submitting the IMSI of the user device. The query may be conducted using an LDAP request. The query may also be conducted by using HTTPS APIs.

At block 1206, the computing device determines whether to allow access to the particular set of network resources in the cellular network based on the network operator identifier. In some embodiments, the computing device has access to a resource access control list (e.g., a black list of disallowed operator-IDs and/or MCC/MNC, or a white list of allowed operator-IDs and/or MCC/MNC) and may use the network operator identifier to determine whether to allow access without querying a subscriber server. In other embodiments, the computing device determines whether to allow access by querying a subscriber server. For embodiments in which the MME is implemented by the computing device, the computing device performs operations represented by blocks 1208, 1210, and 1212 when performing the operations of block 1206.

At block 1208, the computing device embeds the obtained network operator identifier in a resource request to a subscriber server. The resource request may be part of a ULR that also includes an MCC and an MNC of the carrier of the user device.

At block 1210, the computing device receives the response to the resource request from the subscriber server. The response to the request is generated by the subscriber server based on the network operator identifier, the MCC, and the MNC. For example, the subscriber server may disallow access to a set of premium network resources in the cellular network if the network operator identifier is an identifier of an MVNO but not of the host carrier of the cellular network. The subscriber server may also disallow the access when the network operator identifier embedded in the resource request is set to null or zero.

At block 1212, the computing device determines whether to allow access to a particular set of network resources by the user device based on the response to the resource request.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
one or more processors; and
a computer-readable medium storing a plurality of computer-executable components that are executable by the one or more processors to perform a plurality of actions, the plurality of actions comprising:
receiving, at an access management element of a cellular network, an attach request from a user device;
using an identity of the user device to lookup a network operator identifier;
allowing access by the user device to a particular set of network resources in the cellular network when the network operator identifier indicates a first network operator; and
denying access by the user device to the particular set of network resources in the cellular network when the network operator identifier indicates a second network operator.

2. The computing device of claim 1, wherein the plurality of actions further comprises:
embedding the network operator identifier in a resource request to a subscriber server; and
determining whether to allow access by the user device to the particular set of network resources in the cellular network based on a response to the resource request, the response generated by the subscriber server based on the network operator identifier.

3. The computing device of claim 2, wherein:
a mobile network code (MNC) and a mobile country code (MCC) associated with the user device are embedded in the resource request;

the subscriber server generates the response to the resource request based on the network operator identifier, the MNC, and the MCC that are embedded in the resource request.

4. The computing device of claim 2, wherein the resource request is part of an update location request (ULR) to the subscriber server.

5. The computing device of claim 2, wherein the response generated by the subscriber server indicates that the user device is disallowed from accessing the particular set of network resources when the network operator identifier embedded in the resource request is null or set to zero.

6. The computing device of claim 1, wherein:
a first network operator identifier is obtained for a first attach request from a first user device having a first user device identifier, a first mobile network code (MNC), and a first mobile country code (MCC); and
a second network operator identifier is obtained for a second attach request from a second user device having a second user device identifier, a second MNC, and a second MCC, wherein the first MNC is identical to the second MNC and the first MCC is identical to the second MCC.

7. The computing device of claim 1, wherein:
a first network operator identifier is obtained for a first attach request from a first user device having a first user device identifier, a first mobile network code (MNC), and a first mobile country code (MCC);
a second network operator identifier is obtained for a second attach request from a second user device having a second user device identifier, a second MNC, and a second MCC;
access to the particular set of network resources by the first user device is allowed based on the first network operator identifier, the first MNC, and the first MCC; and
access to the particular set of network resources by the second user device is disallowed based on the second network operator identifier, the second MNC, or the second MCC.

8. The computing device of claim 1, wherein the access management element performs Access and Mobility Management Function (AMF) of a dedicated 5G Core Network.

9. The computing device of claim 1, wherein the particular set of network resources comprises a set of 5G network resources.

10. A computer-implemented method, comprising:
receiving, at an access management element of a cellular network, an attach request from a user device;
using an identity of the user device to lookup a network operator identifier;
allowing access by the user device to a particular set of network resources in the cellular network when the network operator identifier indicates a first network operator; and
denying access by the user device to the particular set of network resources in the cellular network when the network operator identifier indicates a second network operator.

11. The computer-implemented method of claim 10, further comprising:
embedding the network operator identifier in a resource request to a subscriber server; and
determining whether to allow access by the user device to the particular set of network resources in the cellular network based on a response to the resource request, the response generated by the subscriber server based on the network operator identifier.

12. The computer-implemented method of claim 11, wherein:
a mobile network code (MNC) and a mobile country code (MCC) associated with the user device are embedded in the resource request;
the subscriber server generates the response to the resource request based on the network operator identifier, the MNC, and the MCC that are embedded in the resource request.

13. The computer-implemented method of claim 11, wherein the resource request is part of an update location request (ULR) to the subscriber server.

14. The computer-implemented method of claim 11, wherein the response generated by the subscriber server indicates that the user device is disallowed from accessing the particular set of network resources when the network operator identifier embedded in the resource request is null or set to zero.

15. The computer-implemented method of claim 10, wherein:
a first network operator identifier is obtained for a first attach request from a first user device having a first user device identifier, a first mobile network code (MNC), and a first mobile country code (MCC); and
a second network operator identifier is obtained for a second attach request from a second user device having a second user device identifier, a second MNC, and a second MCC, wherein the first MNC is identical to the second MNC and the first MCC is identical to the second MCC.

16. The computer-implemented method of claim 10, wherein:
a first network operator identifier is obtained for a first attach request from a first user device having a first user device identifier, a first mobile network code (MNC), and a first mobile country code (MCC);
a second network operator identifier is obtained for a second attach request from a second user device having a second user device identifier, a second MNC, and a second MCC;
access to the particular set of network resources by the first user device is allowed based on the first network operator identifier, the first MNC, and the first MCC; and
access to the particular set of network resources by the second user device is disallowed based on the second network operator identifier, the second MNC, or the second MCC.

17. The computer-implemented method of claim 10, wherein the access management element performs Access and Mobility Management Function (AMF) of a dedicated 5G Core Network.

18. The computer-implemented method of claim 10, wherein the particular set of network resources comprises a set of 5G network resources.

19. One or more non-transitory computer-readable media of a computing device storing computer-executable instructions that upon execution cause one or more processors to perform acts comprising:
receiving, at an access management element of a cellular network, an attach request from a user device;
using an identity of the user device to lookup a network operator identifier;

allowing access by the user device to a particular set of network resources in the cellular network when the network operator identifier indicates a first network operator; and denying access by the user device to the particular set of network resources in the cellular network when the network operator identifier indicates a second network operator.

20. The one or more non-transitory computer-readable media of claim 19, wherein the stored computer-executable instructions upon execution further cause the one or more processors to perform acts comprising:

embedding the network operator identifier in a resource request to a subscriber server; and determining whether to allow access by the user device to the particular set of network resources in the cellular network based on a response to the resource request, the response generated by the subscriber server based on the network operator identifier.

* * * * *